United States Patent [19]

Muguruma

[11] 4,076,269
[45] Feb. 28, 1978

[54] SWING-DRIVE-VEHICLE

[75] Inventor: Yoshikata Muguruma, Takatsuki, Japan

[73] Assignee: Shinpo Kogyo Kabishiki Kaisha, Kyoto, Japan

[21] Appl. No.: 713,197

[22] Filed: Aug. 10, 1976

Related U.S. Application Data

[63] Continuation of Ser. No. 598,251, Jul. 23, 1975, abandoned.

[30] Foreign Application Priority Data

Aug. 7, 1974 Japan .................................. 49-90630
Feb. 5, 1975 Japan .................................. 50-15111
Feb. 5, 1975 Japan .................................. 50-15112

[51] Int. Cl.² ............................................. B62M 1/16
[52] U.S. Cl. .................. 280/218; 280/242 R; 280/282
[58] Field of Search ................ 280/218, 242 R, 210, 280/200, 220, 244, 247, 263, 267

[56] References Cited

U.S. PATENT DOCUMENTS

| | | | |
|---|---|---|---|
| 2,216,982 | 10/1940 | Ollagnon | 280/242 R |
| 2,366,866 | 1/1945 | Moller | 280/221 X |
| 2,745,679 | 5/1956 | Lien | 280/218 |

Primary Examiner—Joseph F. Peters, Jr.
Assistant Examiner—Donn McGiehan
Attorney, Agent, or Firm—Burns, Doane, Swecker & Mathis

[57] ABSTRACT

A vehicle with a new propulsion mechanism is disclosed. This vehicle is driven by a rider making reciprocal lateral swings by means of one or more rods, each of which carries a ground-contacting propelling member (a wheel, a ski or a skate) through a pivotal joint and a carrier, such as a fork, for the propelling member. In most cases, the vehicle is constructed as a cycle. This cycle can be constructed as one which is used by a rider who cannot move his foot for the purpose of propelling the cycle.

The locus of the ground-contact-point of the propelling member is a meandering one.

5 Claims, 30 Drawing Figures

SWING-DRIVE-VEHICLE

This is a continuation of application Ser. No. 598,251 filed July 23, 1975, now abandoned.

This invention relates to a vehicle provided with a new and simple "swing-drive" propulsion mechanism which will be explained later.

In the case of bicycles of the type heretofore known, the following defects characterize them, even though they have many practical advantages:

a. Chain-and-sprocket wheel mechanism for the driving of the wheels must be lubricated suitably. This mechanism sometimes soils the driver's clothes.

b. Cleaning of the above mechanism is a troublesome task.

c. Chain of the above mechanism gradually hangs down. And, when the chain is excessively stretched, the axis of one of the sprocket wheels must be shifted so as to readjust the state of the chain.

d. Provision of a speed-change-gear increases the cost of the bicycle as well as involves use of a part accompanied with a possibility of an occurrence of trouble.

A principal object of the invention is to provide a cycle which is not accompanied with the above-mentioned defects.

Another very important object of the invention is to provide a cycle which can be used by a disabled person who cannot use his feet for the purpose of propelling a cycle.

A further inventive object is to provide a cycle or other vehicle which has an extremely simple propulsion mechanism.

Other objects and advantages of the present invention will be apparent from the following description, taken in connection with the accompanying drawings, in which.

Figure 17:
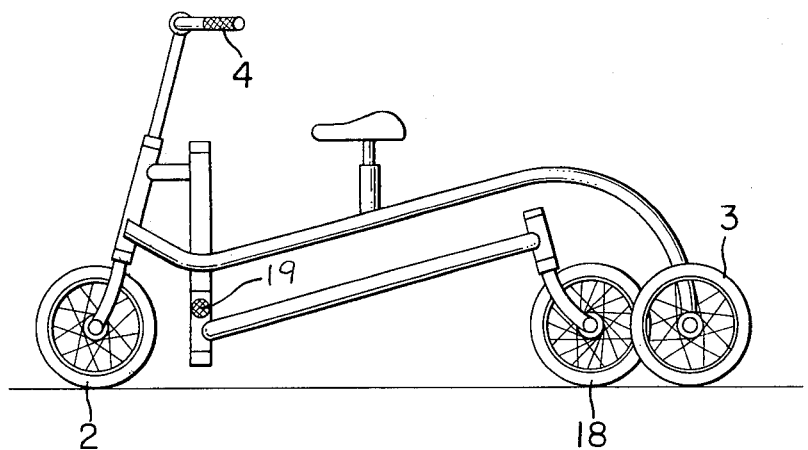
Figure 19:
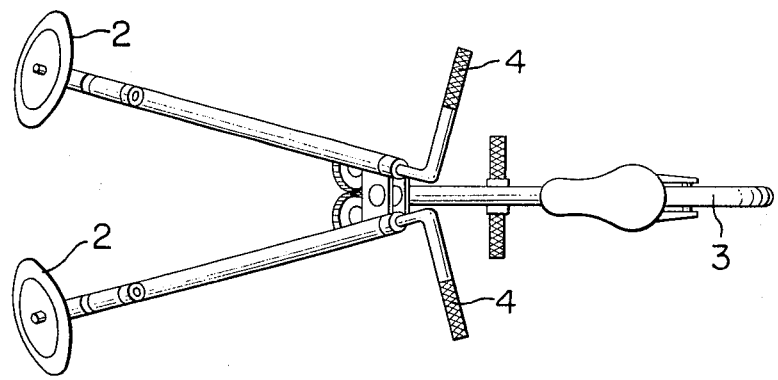
Figure 20:
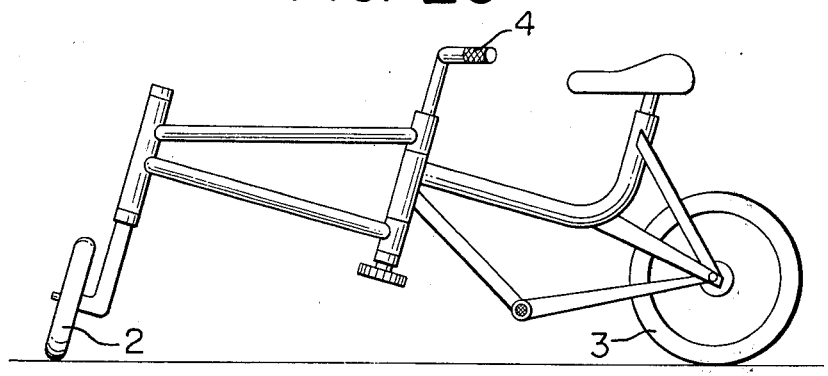
Figure 21:
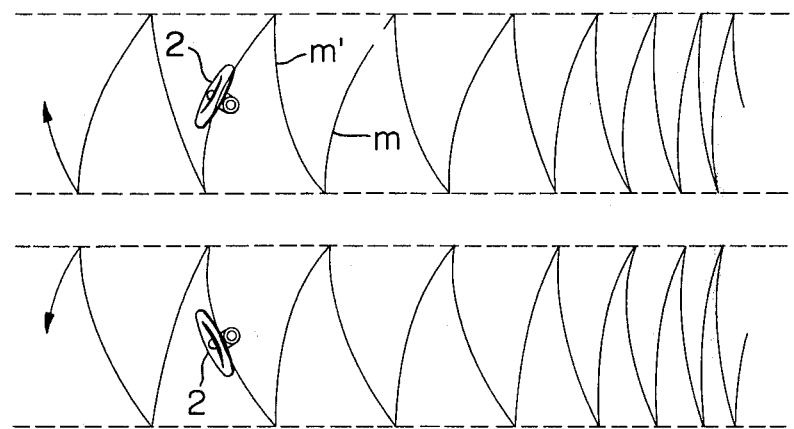
Figure 22:
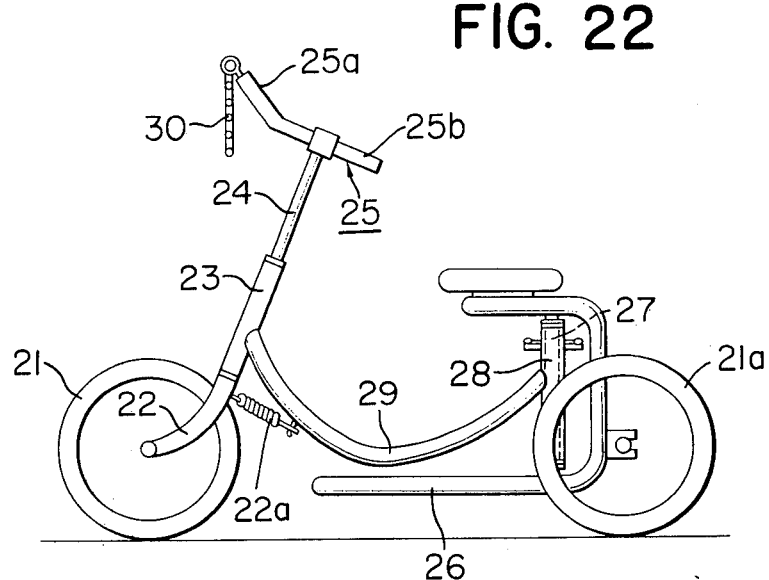
Figure 23:
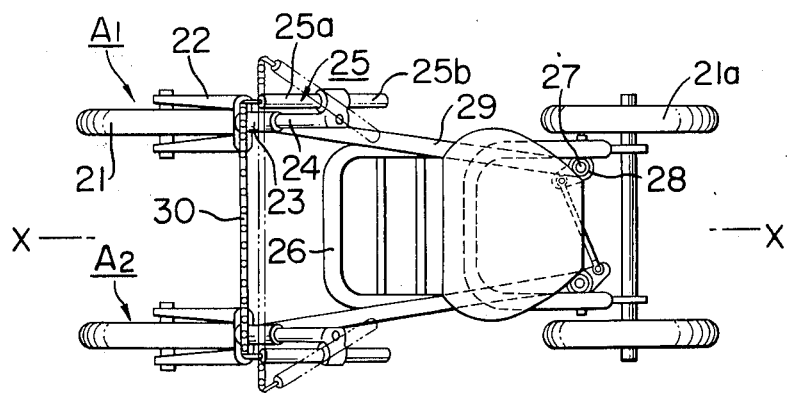
Figure 24:
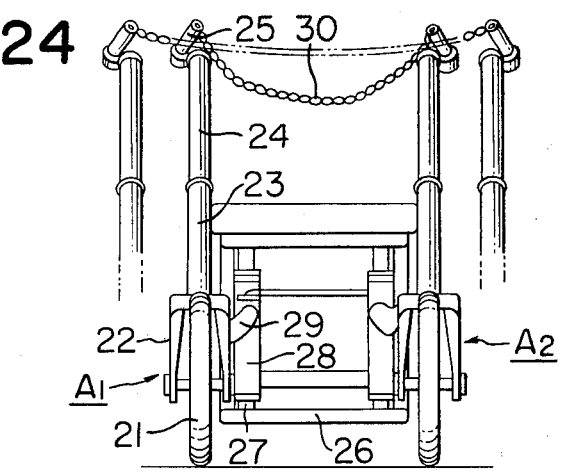
Figure 25:
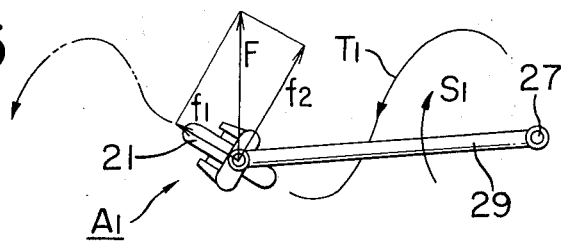
Figure 25:
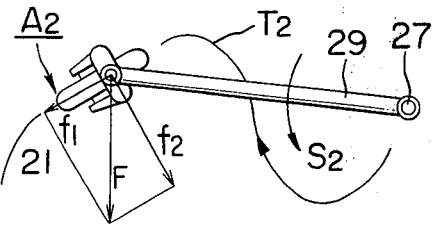
Figure 26:
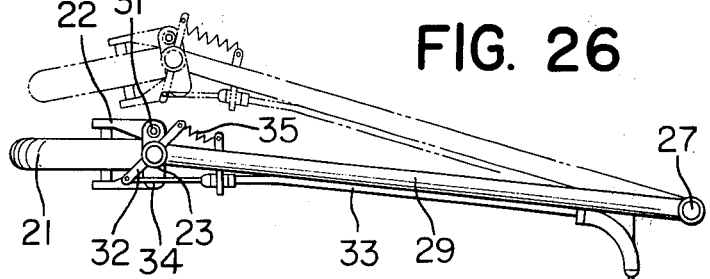
Figure 26:
Figure 27:
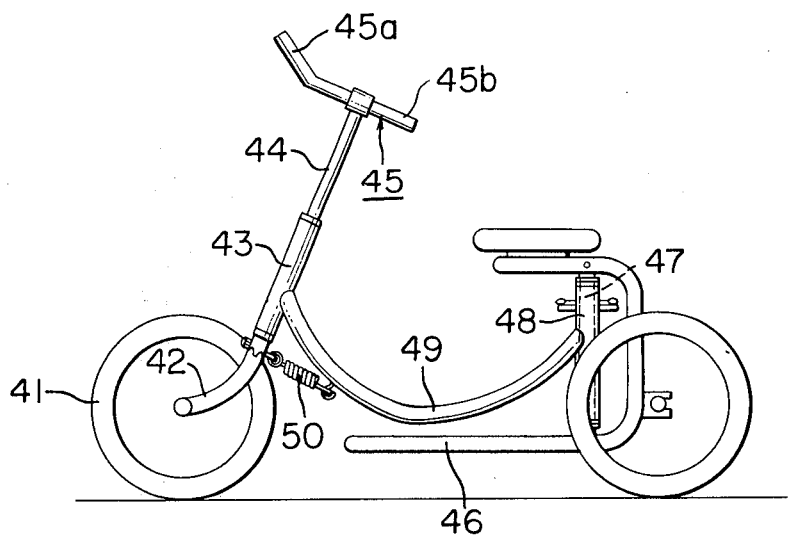
Figure 28:
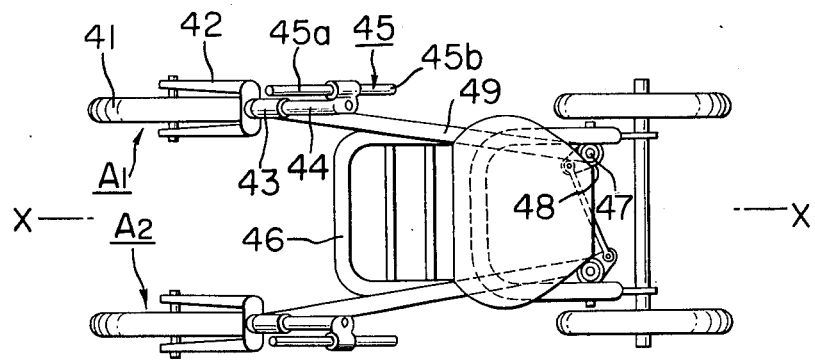

FIGS. 5-20 inclusive are side views and plan views of other "swing-drive" wheeled vehicles according to the present invention, respectively;

FIG. 21 is a plan view showing a pair of loci of road-contact-points of driving wheels of the vehicle shown in FIGS. 19 and 20;

FIGS. 22-24 inclusive are a side view, a plan view, and a front view, respectively, of another "swing-drive" vehicle according to the present invention, which species is provided with a device for avoiding an occurrence of overrun of its right and left assemblies;

FIG. 25 is a diagrammatic explanation of the outward swings of members 29 of the embodiment shown in FIG. 17;

FIG. 26 is a plan view showing a modification of the device for avoiding an occurrence of overrun of the above assemblies; and FIGS. 27 and 28 are a side view and a plan view of another "swing-drive" wheeled vehicle embodying the principles of the present invention.

Figure 1:
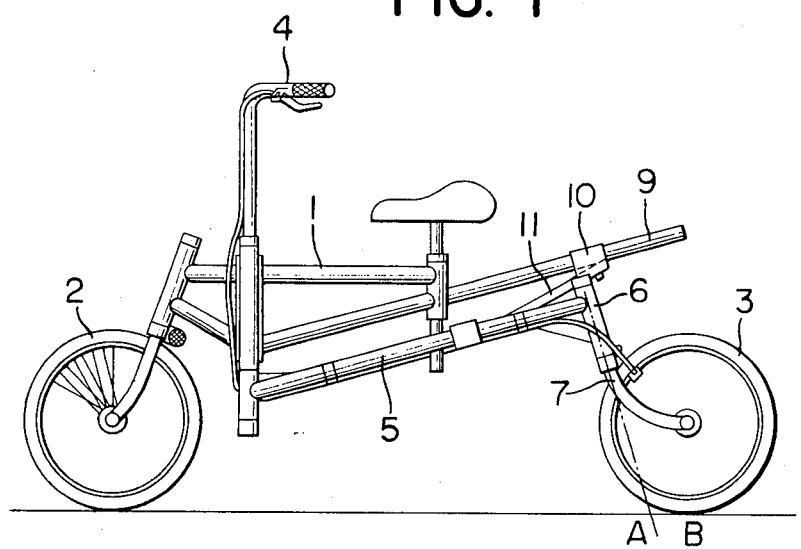
FIG. 1 is a side view of a "swing-drive" wheeled vehicle according to the present invention.
Figure 2:
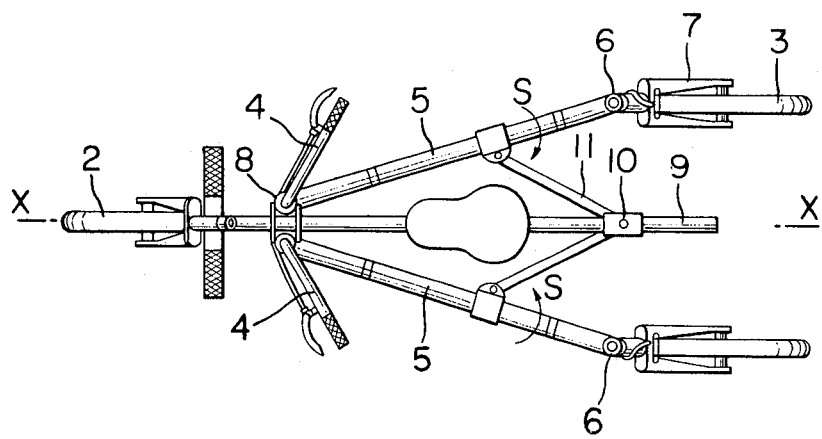
FIG. 2 is a plan view of the vehicle shown in FIG. 1.

Referring now to FIGS. 1 and 2, the "swing-drive" cycle is provided with a frame 1, one front or steering wheel 2 and two rear wheels 3, 3. The lengthwise center plane of the frame 1 is indicated at X — X. The rear wheels 3, 3 can be moved towards and away from this center plane X — X by a driver.

A pair of rods 5, 5 are provided. They are connected at their front ends to right and left handles 4, 4, respectively, which are pivotally supported by bearing members 8, 8 on frame 1. The rods 5 extend rearwardly and, at their rear ends they are attached to forks 7, 7 for rear wheels 3, 3 at pivotal joints 6, 6.

Each of the rear wheels 3, 3 can be swung by a "swing-drive" mechanism comprising handle 4, rod 5, pivotal joint 6, fork 7 and bearing member 8. The bearing member 8 is one which offers a center of swing of this "swing-drive" propulsion mechanism.

The "swing-drive" mechanism for one rear wheel and that for the other wheel are accommodated symmetrically with the center plane X — X of the frame. In a case wherein the cycle is used by a person who cannot use one hand only, one of the swing-drive-mechanisms should be deleted and the fork 7 of the deleted-side should be carried by a member fixed to the frame 1.

The "swing-drive" mechanisms of right and left sides are moved symmetrically by a device composed of a guide bar 9 fixed to the frame 1, and a block 10 slidably fitted to the guide bar 9 and a pair of links 11, 11 connecting rods 5, 5 and block 10 by means of pin-joints.

The fork 7 inclines forwardly, and its profile is curved heavily. The center line of pivotal joint 6 intersects the ground or road surface at a point "A" which lies in front of the road-contact-point "B" of rear wheel 3.

In FIG. 2, the cycle is shown in a state wherein both of the rear wheels 3 are parallel with the center plane X — X and wherein height of the center of gravity is minimum. When the cycle stops, rear wheels 3, 3 turn about pin joints 6, 6 to take this stable state.

When the rods 5, 5 are swung about bearing members 8, 8 to effect outward and inward motions to rear wheels 3, 3 a frictional force acts for each rear wheel 3. The rear wheel 3 takes a toe-in state by this frictional force when the rod 5 is given an inward swing "S". On the other hand, this wheel 3 takes a toe-out state by the above frictional force when rod 5 is given an outward swing.

Figures 3A, 3B, 3C:
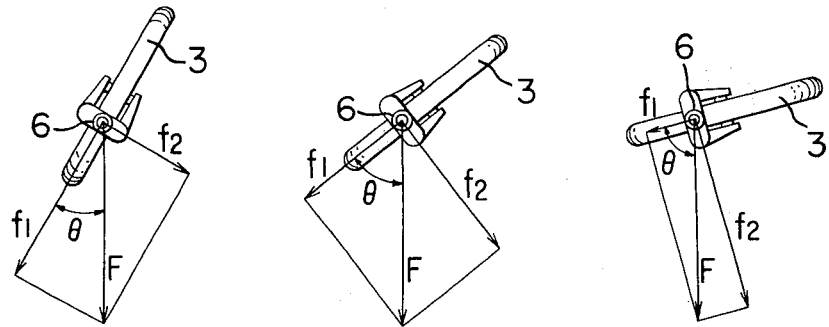
FIG. 3a, FIG. 3b and FIG. 3c are views explaining forces and their components which act on the rear wheels of the "swing-drive" vehicle shown in FIGS. 1 and 2.
Figure 4:
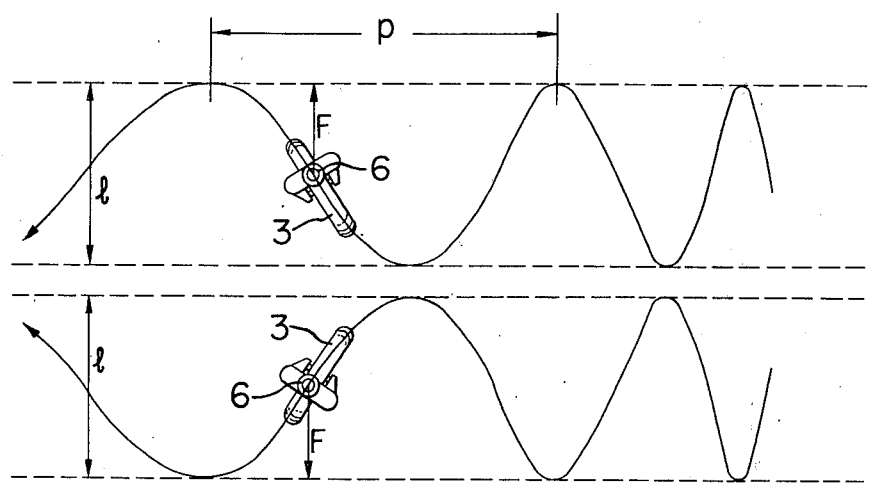
FIG. 4 is a plan view showing a pair of loci of road-contact-points of the rear wheels of the vehicle shown in FIGS. 1 and 2.

FIG. 3a, FIG. 3b and FIG. 3c, respectively show a driving force "F" and its components "$f_1$", "$f_2$" which act on the rear wheel 3 in the toe-in state. The component "$f_1$" is effective for the driving of the rear wheel 3, and the component "$f_2$" perpendicular to component "$f_1$" is non-effective for driving the rear wheel 3. The invalid component "$f_2$" tends to make a skid of rear wheel 3. But, the occurrence of a skid is avoided in most cases by a frictional force which acts between the road surface and rear wheel 3 in a direction of skid.

The minimum value "$f$" sufficient to roll the rear wheel 3 has the following characteristics:

1. "$f$" is high at a time of starting.
2. "$f$" is high at a time of running on bad or rising road.
3. Rear wheel 3 rolls in a state wherein it is inclined for the center plane X — X by an angle to create "$f$". This angle is a "toe-in angle" or a "toe-out angle" of rear wheel 3 and is complementary with the angle θ shown in FIGS. 3a, 3b and 3c, respectively.

The operating force "F" acting on pivotal joint 6 propels the cycle by its component "$f_1$" which is sufficiently larger than the above force "$f$". In the case of the ordinary cycle, its wheel is driven by a "torque" acting on its axle. But, in the case of the above-explained cycle, rear wheel 3 is rotated by the force "$f_1$" which is a "tractive force". Accordingly, it will be easily noticed that rear wheel 3 can be replaced by a sliding ground-contacting propelling member such as a ski or a skate.

Rear wheel 3 becomes parallel to the center plane X — X at the end of the swing-stroke of rod 5, wherein the force "F" is equal to zero. Wheel 3 rolls in a toe-in state towards the center plane X — X, and rolls in a toe-out state outwards from the center plane X — X.

Loci of the road-contact points "B" of the rear wheels are shown in FIGS. 3a, 3b and 3c, respectively. In these figures, "1" and "p" are a stroke of swing and a pitch of meandering, respectively. The pitch "p" is shown on a reduced scale. For example, the swing-stroke "1" and the pitch "p" may be of the order of 30cm and 10m, respectively, when the cycle runs on a relatively good and flat road. The pitch "p" of meandering decreases as the above-mentioned force "$f_1$" increases, and vice versa. In other words, the amount of advance of the cycle for one swing of handle 4 decreases automatically when the condition of road surface becomes bad for the driving of the cycle. This means that the above cycle has an ability which is similar to that of a speed-change-gear.

Figure 5:
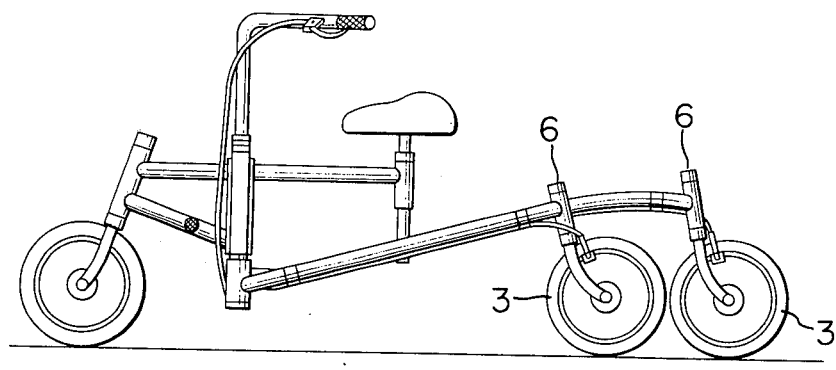
Figure 6:
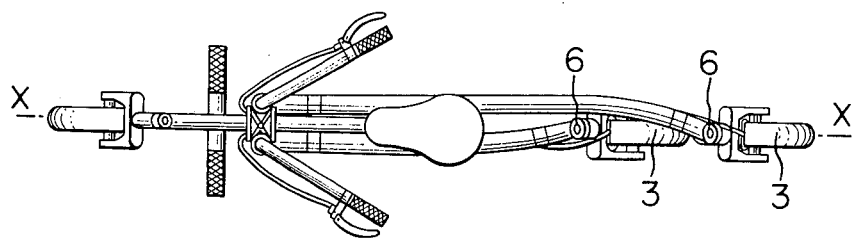

FIGS. 5 and 6 show a modification of the above explained cycle. In the case of this cycle, the pivotal joints 6, 6 are located on the center plane X — X, and the two rear wheels 5, 5 are arranged before and behind.

Figure 7:
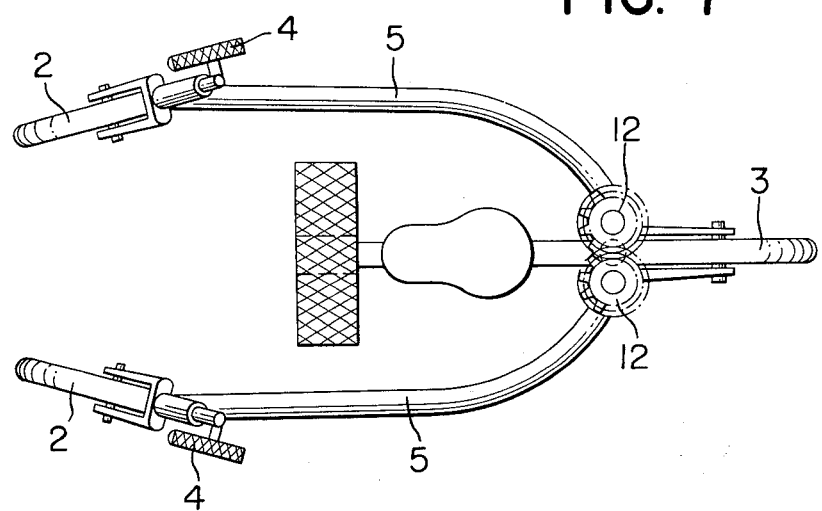
Figure 8:
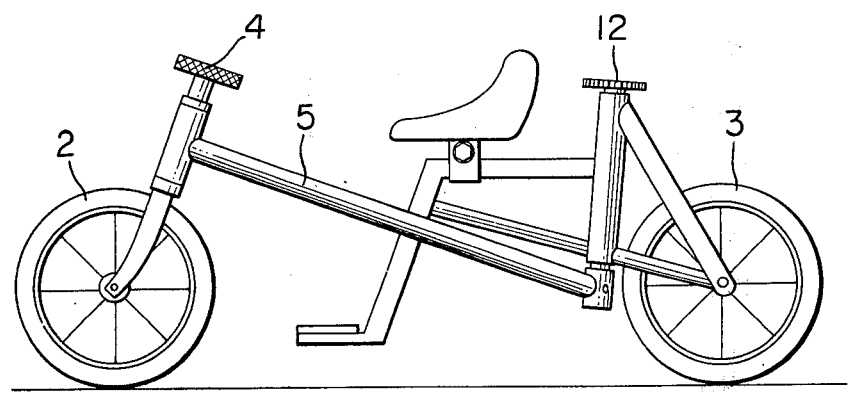

FIGS. 7 and 8 show a cycle provided with two front wheels 2, 2 which will be swung by rods 5, 5. Rods 5, 5 are moved synchronously by the provision of an interlocking device consisting of a pair of pinions each of which is fixed to the rear end of rod 5.

Figure 9:
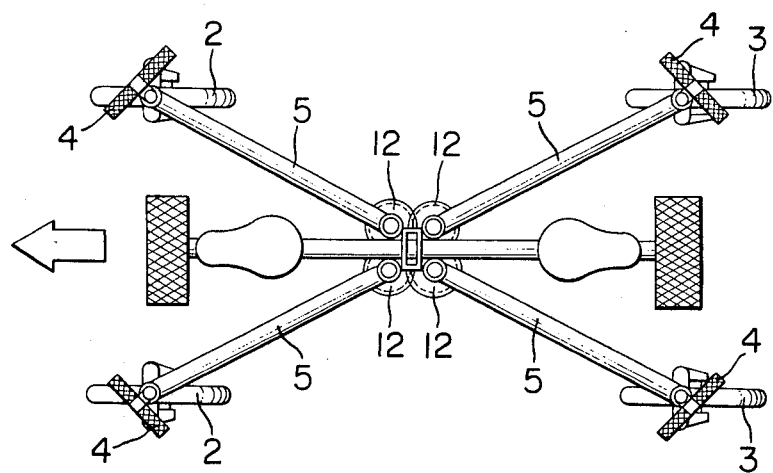
Figure 10:
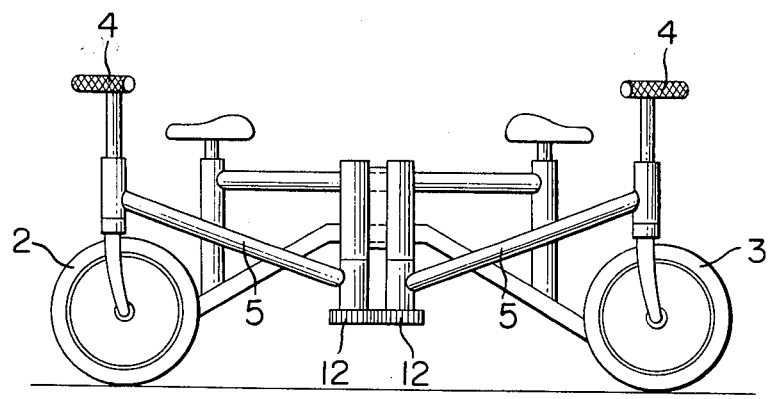

FIGS. 9 and 10 show a two-seater. In the case of this cycle, two front wheels 2, 2 and two rear wheels 3, 3 are respectively driven by two riders. Four pinions 12 are provided similarly to the case of FIGS. 6 and 7.

Figure 11:
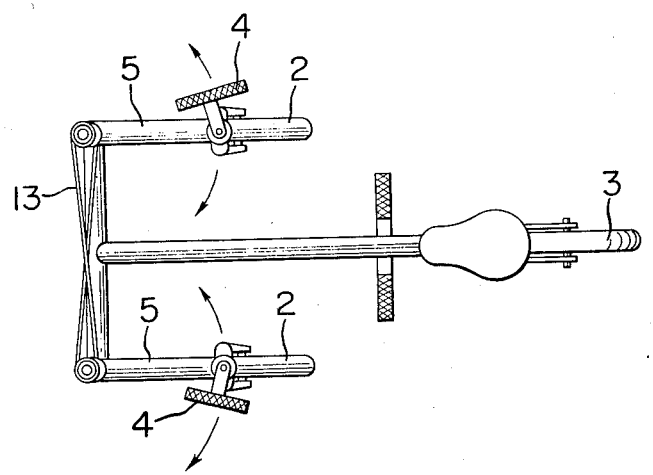
Figure 12:
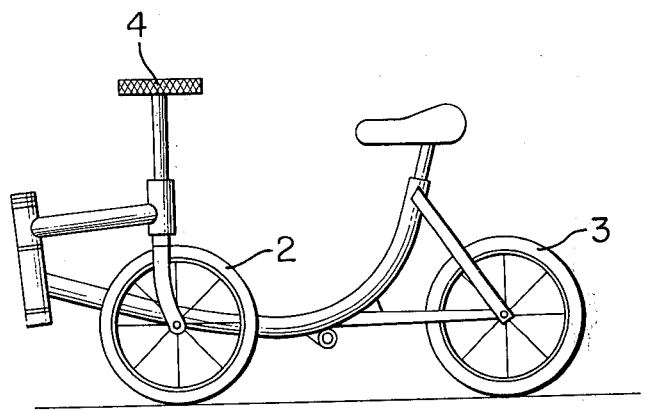

FIGS. 11 and 12 show a cycle wherein a belt 13 is used for interlocking rods 5, 5. In this case two front wheels 2, 2 are used for driving the cycle.

Figure 13:
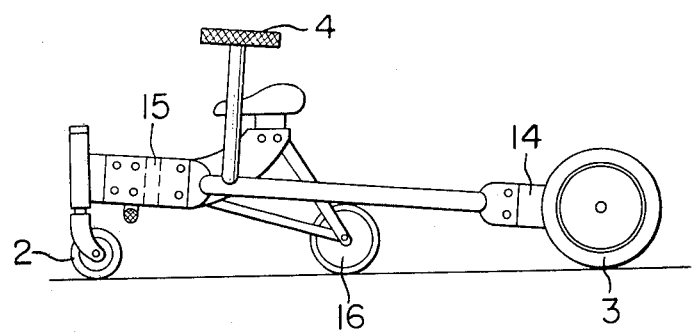
Figure 14:
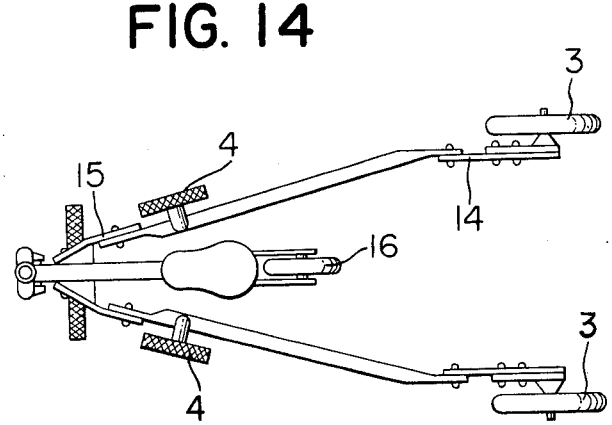

FIGS. 13 and 14 show a cycle wherein leaf springs 14, 15 are used in lieu of pivotal joints 6 and the bearing member 8 shown in FIG. 2, respectively. As the leaf spring 14 acts to restore the rear wheel 3, there is no problem about the point "A" or "B" shown in FIG. 1. In this case, another wheel 16 is provided to prevent an occurrence of unwanted rolling.

Figure 15:
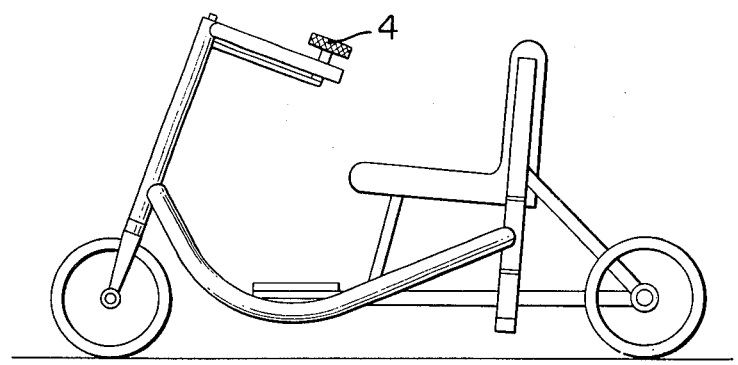
Figure 16:
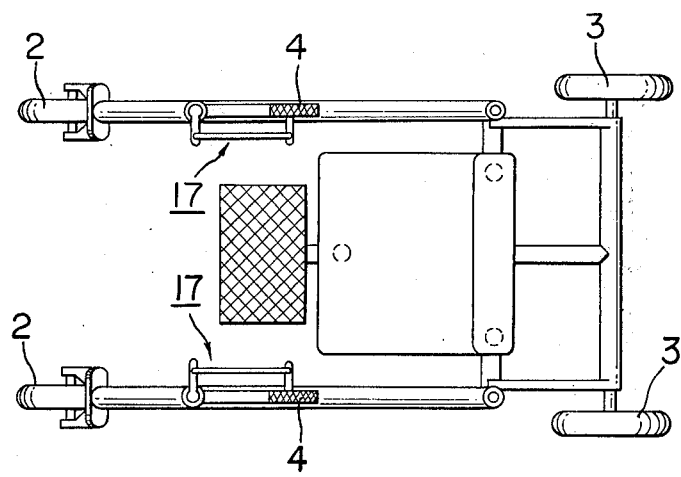

FIGS. 15 and 16 shows a four-wheeler cycle. In this case, the front wheels 2 are used for propelling the cycle. There is provided a link means 17 between handle 4 and rod 5 to transmit motion of the former to the latter.

Figure 18:
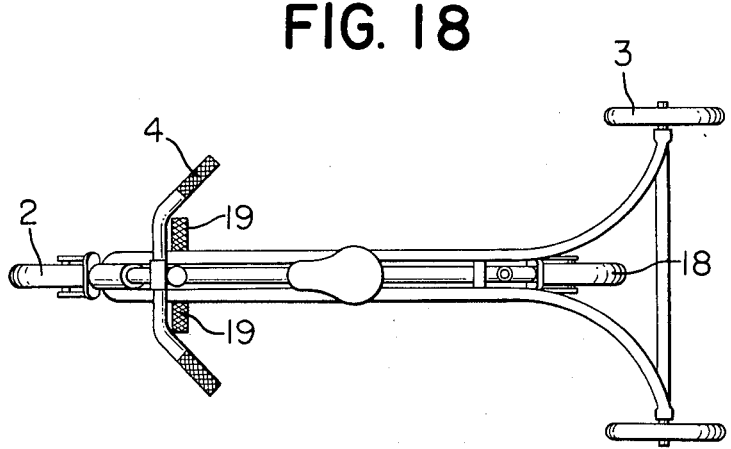

FIGS. 17 and 18 show a cycle provided with pedal rods 19. In the case of this cycle, neither front wheel 2 nor rear wheel 3 is driven, and still another wheel 18 is provided as a propelling wheel. The rear wheels 3, 3 are necessary to stabilize the cycle. The cycle runs when the pedal rods 19 are pushed down alternatively.

FIGS. 19 and 20 show a cycle which is constructed to climb up a relatively steep slope. In the case of this cycle, the loci of the road contact points become sharpened at the ends of swing-strokes, as shown in FIG. 21.

FIGS. 22, 23 and 24 show a cycle which is provided with a means for avoiding an occurrence of over-swing of the handle. In these figures and FIGS. 26 to 28 inclusive, different numerals are used compared with the heretofore explained cases.

Referring to FIGS. 22–24, a pair of assemblies $A_1$, $A_2$ are provided symmetrically. Each of these assemblies is composed of a front wheel 21, a front carrier or fork 22, a member 29 provided at its front end with a head tube 23, a handle stem 24 and a handle 25. The member 29 corresponds to the rod 5 of the above-described cycles. This member 29 is supported at its rear end 28 by an upright shaft 27 fixed to a frame 26 on which is mounted a rear wheel 21a. A head tube of an ordinary bicycle is fixed to a frame, but in the case of this cycle head tube 23 is not fixed to frame 26.

Each of the assemblies "$A_1$", "$A_2$" can be swung about the upright shaft 27 by a force "F" applied to handle 25 by the rider. Handle 25 is gripped at its front portion 25a or at its rear portion 25b by the rider. The portion 25a extends forwardly from the top-end of the handle stem 24. On the other hand, the portion 25b extends rearwardly from the top-end of handle stem 24.

When the rider grips the portion 25a of handle 25 and the members 29 are swung outwardly, the front wheels 21 roll to drive the cycle forwardly by the effective components "$f_1$" of the force "F" taking a "toe-out state". On the other hand, when the rider grips the portion 25b of handle 25 and the members 29 are swung outwardly, the front wheels 21 roll to drive the cycle backwardly by the effective component "$f_1$" of the force "F" taking a "toe-in state". Hereafter, the portions 25a and 25b are expressed by the terms "front grip" and "rear grip", respectively. A spring 22a is arranged to facilitate operation in the manner described hereinafter with respect to the spring 50 shown in FIG. 27.

FIG. 25 shows the outward swings "$S_1$", "$S_2$" of the members 29, the toe-out state of front wheels 21, the force "F", the components "$f_1$", "$f_2$" of force "F" and a pair of loci "$T_1$", "$T_2$" of the road-contact-points of front wheels 21, the toe-out state of front wheels 21 being effected by the use of front grip 25a. Following the outward swing "$S_1$", "$S_2$", members 29 are swung inwardly by the forces "F" now changed in directions from outward to inward ones. As the state of the front wheels 21 is changed from "toe-out" to "toe-in" together with the above directions of the forces "F", the effective components "$f_1$" continue to keep their forward directions so as to advance the cycle.

Each of the cycles shown in FIGS. 7, 9, 11, 13 and 15 is provided with a handle 4 which is similar with the above handle 25 consisting of a front grip 25a and a rear grip 25b. Accordingly, these cycles are capable of being driven backwardly also.

The right assembly "$A_1$" and left assembly "$A_2$" are connected at their front grips 25a by a slackening member 30 such as a chain or rope. Suitably this member 30 hangs in a state shown in FIG. 24. To simplify the explanation, a term "diverging of assemblies" will be used. This term means that both of the assemblies move far from the center plane X — X simultaneously.

The functions of the slackening member 30 are as follows.

a. The slackening member 30 avoids an occurrence of an accidental throwing out of the rider due to the "diverging of assemblies" in an excessive degree.

This member 30 limits the degree of "diverging of assemblies" even when the rider's hands leave the handles 25.

b. The slackening member 30 enables acceleration of the cycle quickly. The rider can operate the handles 25 sufficiently quickly without any care about an occurrence of the above accident.

c. The slackening member 30 improves the ease of driving, as the rider can feel the stroke-ends of the handles 25 by the provision of this member. And, this is especially preferable for an unskilled rider.

When the assemblies "$A_1$", "$A_2$" are swung outwardly, slackening member 30 is placed in a taut state before members 29 come to their stroke-ends. Tension "$m$" acting on member 30 is relatively small, and it acts to decrease the toe-out angle of front wheels 21, because the member 30 is provided between the front grips 25a and connects them. The toe-out angle is reduced to zero when members 29 reach their stroke-ends. This is very important for the protection of the slackening member 30. Were the member 30 provided between the forks 22, it would act to stop the outward movements of the assemblies "$A_1$", "$A_2$" instantaneously and big force would be applied on it such as to shorten its life.

FIG. 26 shows a device which is provided in lieu of the above-described slackening member 30. This device consists of pins 31 fixed to the front forks 22, rotatable levers 32 provided concentrically with the head tubes 23, a wire 34 guided by a tube 33 along the members 29 and springs 35. The device acts according to the next two steps:

First step:

When the assemblies are swung outwardly, wire 34 turns the levers 32. Each lever 32 comes into contact with pin 31 before members 29 come to their stroke-ends.

This step corresponds to the stretching of the slackening member 30.

Second step:

Following the first step, forces due to the springs 35 act on the pins 31 to turn the forks 22 so as to decrease the toe-out angle of front wheels 21. This step corresponds to the change of toe-out angle by the tension "$m$". The forces due to springs 35 come to zero when front wheels 21 become parallel with the center-plane of the frame.

FIGS. 27 and 28 show a cycle with a pair of assemblies "$A_1$", "$A_2$", which are interlocked by a link mechanism so as to move synchronously, and, each of the assemblies "$A_1$", "$A_2$" consists of a front wheel 41, a front fork 42, a member 49 with a head tube 43 at its front end, a handle stem 44, a handle 45 with front and rear grips 45a, 45b, and a spring 50 provided between the member 49 and the front fork 42, similarly with the case of the cycle shown in FIG. 22, each of the assemblies "$A_1$", "$A_2$" being supported at its member 49 by a shaft 48 fixed to a frame 46. The spring 50 enables application of a force "F" of outward or inward direction to member 49 under a state wherein the rider's wrists are not excessively tired due to existence of a distance between the center of the handle stem 44 and the force applying point for the front grip 45a.

All of the embodiments are those which are constructed as cycles, but the wheels of these cycles can be substituted by members which will slide on a surface of snow or ice, as the forces acting om them are tractive forces.

I claim:

1. A swing drive vehicle comprising a frame member, at least one ground contacting member mounted on said frame member, two assemblies disposed symmetrically and laterally of said frame member, each assembly comprising a steering column means, a handle member secured to the top of the steering column means, a rod member secured to said steering column means and pivotally mounted at the other end to said frame member with respect thereto, a fork member mounted at the lower end of said steering column means, and a ground contacting element mounted on said fork member, whereby said assemblies may be moved synchronously in diverging and converging directions by said handle members with respect to said frame member so as to impart a motion to the vehicle.

2. A swing drive vehicle as claimed in claim 1 wherein said handle member includes a portion extending forwardly of said steering column means and a rearwardly extending portion to facilitate the synchronous divergent and convergent movement of said assemblies.

3. A swing drive vehicle as claimed in claim 2 and further comprising means extending between and secured to the forward ends of the forwardly extending portions of said handle members for limiting divergent movement of said assemblies.

4. A swing drive vehicle as claimed in claim 1, and further comprising means secured at opposed ends thereof to the rod member of each assembly to provide synchronous movement of each assembly.

5. A swing drive vehicle as claimed in claim 1, and further comprising a resilient means between each fork member and its associated rod member to bias the direction of the ground contacting element associated with said fork member to conform with the direction of said rod member.

* * * * *